Aug. 6, 1968         T. D. H. ANDREWS         3,395,948
HYDRAULICALLY BALANCED SLIPPER BEARING
Filed April 1, 1966

INVENTOR
Thomas D. H. Andrews
BY
Christensen, Sanborn
and Matthews
ATTORNEY

United States Patent Office 3,395,948
Patented Aug. 6, 1968

3,395,948
HYDRAULICALLY BALANCED SLIPPER
BEARING
Thomas D. H. Andrews, Cheltenham, England, assignor to Dowty Technical Developments Limited, Cheltenham, England, a British company
Filed Apr. 1, 1966, Ser. No. 539,483
Claims priority, application Great Britain, Apr. 10, 1965, 15,348/65
8 Claims. (Cl. 308—5)

ABSTRACT OF THE DISCLOSURE

A hydraulically balanced slipper bearing is disclosed comprising a backing member having a uniform bearing surface, a slipper having a slipper surface including a continuous land enclosing a recess of substantial area, the land being shaped to fit closely against the uniform bearing surface and the recess being of very shallow depth relative to the land, means for applying a holding force to the slipper to hold the land against the bearing surface, and an unrestricted passage having a diameter greater than the extent of said depth adapted to supply hydraulic liquid at pressure to the recess, the very shallow depth of the recess being such as to insure a substantial pressure gradient between the passage and the land.

Figure 1:
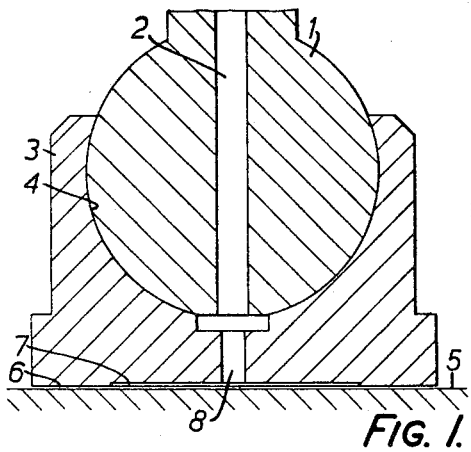

This invention relates to hydraulic apparatus and more particularly to hydraulically balanced slippers. A slipper is a device capable of sliding with little friction over a uniform bearing surface and at the same time transmitting normally to the surface a large force referred to in this specification as the holding force. In a known kind of hydraulically balanced slipper bearing the slipper surface in contact with the uniform bearing surface includes a continuous land enclosing a recess fed with liquid at pressure through a restrictor, the recess being of such depth that liquid within the recess is at substantially the same pressure throughout the recess. The area of the recess is arranged so that if the liquid pressure at the entry to the restrictor were to act over the area of the recess a parting force would be generated sufficient to overcome the holding force so that the slipper would lift away from the bearing surface. In operation the slipper lifts very slightly from the bearing surface to allow a small leak between the land and the bearing surface, the flow of liquid through the restrictor to compensate for such leakage then reducing pressure in the recess. The lift of the slipper will adjust itself to the condition where the leakage will cause a pressure reduction in the restrictor so that the parting force generated exactly balances the holding force. In the design of a hydraulically balanced slipper the slipper stiffness is an important factor. Stiffness may be defined as the ratio between change in the applied holding force on the slipper and the resulting change in the clearance of the slipper surface from the bearing surface. This ratio may be represented as a fraction in which the change in force is the numerator and the change in clearance is the denominator. It is usually desirable that the stiffness of a slipper should be as large as possible. The restrictor is usually formed as a hole or a channel of very small cross-sectional area. It is not uncommon for the restrictor to become blocked with small particles of solid matter and in such case no liquid is fed to the slipper surface and direct contact occurs between the slipper and the bearing surface such that wear will take place very quickly. The object of this invention is to provide a structure of hydraulically balanced slippers in which the restrictor is less likely to become blocked than the restrictor of the known type of slipper mentioned above.

Hydraulically balanced slippers are used in hydraulic piston and cylinder types of pump or motor, a slipper being associated with the piston to cause piston reciprocation during movement of the cylinder relatively to the surface with which the slipper co-operates. Such pumps or motors may be of the swash plate type, the tilting head type, or the radial eccentric track ring type. The surface with which the slipper co-operates must be uniform in the sense that movement of the slipper over the surface will cause no variation in clearance between the surface and the land. The surface therefore must be plane or regularly curved e.g., spherical or cylindrical.

In accordance with the present invention a hydraulically balanced slipper bearing comprises a backing member having a uniform bearing surface, a slipper having a slipper surface including a continuous land enclosing a recess of substantial area, the land being shaped to fit closely against the uniform bearing surface and the recess being of very shallow depth relative to the land, means for applying a holding force to the slipper to hold the land against the bearing surface and a passage adapted to supply hydraulic liquid at pressure to the recess.

Preferably the slipper surface includes a groove deeper than the recess located in the recess adjacent the land.

A plurality of recesses may be provided within the continuous land by extending the land inwardly to the passage at a plurality of positions.

Each such recess may then include a groove adjacent to the continuous land.

Figure 2:
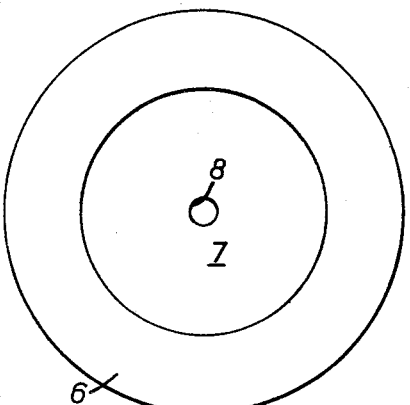
Figure 3:
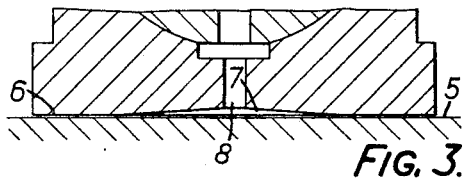
Figure 4:
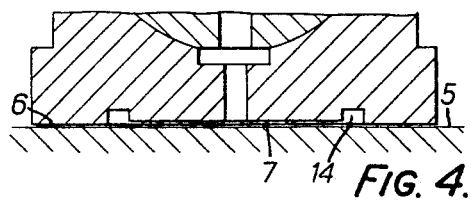
Figure 5:
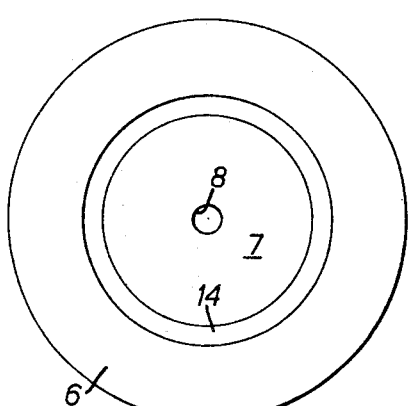
Figure 6:
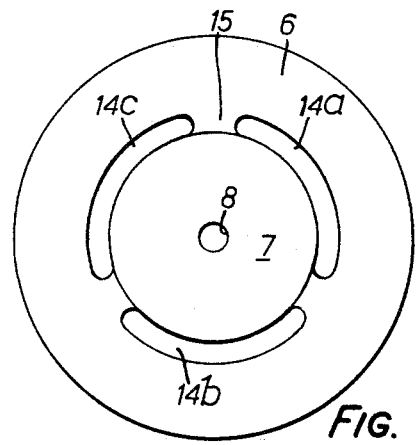
Figure 7:
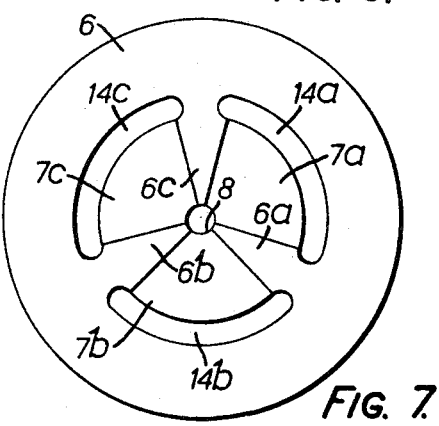

How the invention may be carried into effect will now be particularly described with reference to the accompanying drawings, in which:

FIGURES 1 and 2 are cross-section and plan of the slipper surface of the first embodiment, FIGURE 3 is a cross-section through a modified version of the FIGURE 1 embodiment, FIGURES 4 and 5 are cross-section and plan of the slipper surface of a further embodiment of the invention, and, FIGURES 6 and 7 are plan views of the slipper surface of two further embodiments of the invention.

All of the described embodiments are intended for use either in swash plate pumps or motors or in tilting head pumps or motors as shown in U.S. Patent No. 3,200,760.

In the embodiment of FIGURES 1 and 2, the ball 1 forms either the end of the piston in the swash plate kind of pump or the end of a connecting rod in the pump shown in the said prior patent. A central passage 2 carries liquid at pressure from the associated cylinder. The slipper 3 is mounted on the ball joint 1 by means of a spherical socket 4. The slipper engages the flat surface 5 of a swash plate, wear plate or the like. The portion of the slipper 3 engaging the surface 5 includes a slipper surface which comprises a circular land 6 and a circular central recess 7 enclosed by the land 6. Centrally of the recess 7 a passage 8 passes through the slipper making a substantially unrestricted connection with the passage 2 in the socket 4. The recess 7 is of uniform shallow depth and in the illustrated example could be about 0.0005 inch. The recess 7 may be formed in the slipper surface by a simple stamping operation.

In operation of the pump or motor including the slippers of FIGURES 1 and 2 the slipper 3 is driven over the uniform surface 5 either by a separate drive member or by a force imparted from the ball 1. The slipper is also pressed against the uniform surface 5 by the ball 1 by the hydraulic pressure exerted on the associated piston. This is the holding force and the ball is the means for applying the holding force. The recess 7 is almost equal in diameter to the diameter of the associated piston. The outer diameter of the land 6 is considerably larger than the diameter of the associated piston. In normal operation hydraulic liquid fed through the passages 2 and 8 enters the recess 7 at its centre and flows radially outwards between the base of the recss 7 and the uniform surface 5. In normal operation the land 6 will be spaced at a clearance of between 0.0002 and 0.0005 inch from the surface 5. At the periphery of the recess 7 the leakage liquid will have lost about 30% of the pressure at the passage 8. The leakage liquid then passing between the land 6 and the surface 5 will lose the remainder of the pressure fairly uniformly. If there is an increase in holding force on the slipper, the clearance between the slipper surface and the uniform surface 5 will reduce. Proportionally the clearance between the land 6 and the surface 5 will reduce more than the clearance between the base of recess 7 and the surface 5. There will be a reduction in leakage flow and the pressure loss of liquid flowing between the base of recess 7 and the surface 5 will be reduced. In other words the pressure over the majority of the recess 7 will rise to provide a greater hydraulic parting force to meet the increased holding force.

Reference is now made to FIGURE 3 of the accompanying drawings. This figure is the same as FIGURE 1 with the exception of the recess and like reference numerals will therefore be used for like parts. In FIGURE 3 the recess 7 has a base whose depth increases from its junction with the land 6 to the central passage 8. Variation in depth of the recess 7 is quite small so that under any condition of operation the base of the recess in conjunction with the uniform surface 5 will still provide restriction to flow of leakage from passage 8 through the recess to the land 6. The arrangement of the base of the recess 7 as shown in FIGURE 3 gives some slight alteration to the pressure distribution in the recess. In the FIGURE 1 construction the pressure gradient is much greater immediately adjacent to the passage 8. The operation of the FIGURE 3 slipper is as described for FIGURE 1.

Reference is now made to FIGURES 4 and 5 of the drawings. Again this embodiment resembles the embodiment of FIGURE 1 and like reference numerals will refer to like parts. The variation from the FIGURE 1 construction lies in the provision of an annular groove 14 around the edge of the recess 7 adjacent to the internal diameter of the land 6. The groove 14 is considerably deeper than the recess 7 and it serves the function of an accumulator for liquid at an intermediate pressure between the pressure of passage 8 and the low reservoir pressure exteriorly of the slipper. Over the effective area of the groove 14 which faces the uniform surface 5 there will be no pressure drop. The function of the groove 14 is to concentrate the pressure drop within the recess 7 into a smaller area as compared with the example of FIGURE 1.

Reference is now made to the embodiment shown in FIGURE 6. This embodiment varies from the FIGURES 4 and 5 embodiments in that the groove 14 is now divided into three equal parts 14a, 14b, and 14c by projections 15 from the land 6. These projections do not extend greatly into the recess 7. The purpose of the FIGURE 6 arrangement is to increase the resistance of the slipper to tipping about any axis in the plane of the slipper surface. Slipper resistance to tipping may be defined as the ratio between a tipping torque applied to the slipper and the resulting angular tipping movement of the slipper about an axis in the plane of its surface. In the FIGURE 4 embodiment resistance to tipping is not high because pressure around the groove 14 does not vary in response to tipping. In the FIGURE 6 embodiment if tipping occurs which for example will bring the land 6 adjacent to the groove 14 nearer to the uniform surface 5 the leakage over that portion of the land 6 will reduce to give an uneven distribution of leakage pressure flow between the base of the recess 7 and the uniform surface 5, which results in pressure in the groove 14a being somewhat higher than the pressure in the grooves 14b and 14c. In this way there is an increased resistance of the slipper against tipping. The operation of the FIGURE 6 embodiment in response to change in holding force is as described for FIGURE 1.

The FIGURE 7 embodiment is a development of the embodiment of FIGURE 6 with a view to further increasing the tipping resistance of the slipper. Again the groove 14 is divided into the three parts 14a, 14b and 14c. In between the parts of the groove the land 6 is extended through the recess 7 to the passage 8, these parts of the land being indicated by the references 6a, 6b and 6c. The recess 7 is now divided into three equal parts 7a, 7b and 7c. The response of the slipper of FIGURE 7 to change in the holding force will be exactly as described for FIGURE 1. The operation of the FIGURE 7 embodiment in response to tipping will be as described for FIGURE 6 with the exception that the greater isolation of the groove parts 14a, 14b and 14c will give greater pressure differences in them following tipping than will the FIGURE 6 embodiment. Therefore there will be greater resistance to tipping. The pressure gradients within the three recess portions 7a, 7b and 7c will be the same only when the slipper is symmetrically placed having regard to the uniform surface 5. Any tipping will disturb the pressure distribution to increase the pressure on the part of the slipper which tends to move nearer to the surface 5.

In the embodiments of FIGURES 6 and 7 the groove may be divided into more than three parts.

In all of the described embodiments the slipper stiffness is not inferior to the stiffness of known hydraulically balanced slippers, but at the same time since the restrictor of the known slipper has been replaced by a shallow recess in the slipper surface of large surface area it will be seen to be very difficult for such a restrictor to be blocked by any solid matter carried by the liquid.

I claim as my invention:

1. A hydraulically balanced slipper bearing comprising a backing member having a uniform bearing surface, a slipper having a slipper surface including a continuous land enclosing a recess of substantial area, the land being shaped to fit closely against the uniform bearing surface and the recess being of very shallow depth relative to the land, means for applying a holding force to the slipper to hold the land against the bearing surface and an unrestricted passage having a diameter greater than the extent of said depth adapted to supply hydraulic liquid at pressure to the recess, the very shallow depth of the recess being such as to ensure a substantial pressure gradient between the passage and the land.

2. A hydraulically balanced slipper bearing as claimed in claim 1, including a plurality of very shallow recesses within the continuous land isolated one from the other by extending the land inwardly to the passage at a plurality of positions, the depth of each very shallow recess being such as to ensure a very substantial pressure gradient between the passage and the land.

3. A hydraulically balanced slipper bearing as claimed in claim 1, wherein the means for applying a holding force comprises a ball socketed into the slipper and adapted to be connected to a force exerting member such as a piston.

4. A hydraulically balanced slipper as claimed in claim 1, wherein the slipper surface includes a plurality of arcuate grooves located in end-to-end relation in the recess adjacent to the land.

5. A hydraulically balanced slipper as claimed in claim 1, wherein the recess is of uniform very shallow depth of about 0.0005 inch relative to the land.

6. A hydraulically balanced slipper bearing as claimed in claim 1, wherein the recess is of varying very shallow depth.

7. A hydraulically balanced slipper bearing comprising a backing member having a uniform bearing surface, a slipper having a slipper surface including a continuous land enclosing a recess of substantial area, the land being shaped to fit closely against the uniform bearing surface and the recess being of very shallow depth relative to the land, means for applying a holding force to the slipper to hold the land against the bearing surface and a passage adapted to supply hydraulic liquid at pressure to the recess, the slipper surface including a groove deeper than the recess located in the recess adjacent to the land.

8. A hydraulically balanced slipper bearing comprising a backing member having a uniform bearing surface, a slipper having a slipper surface including a continuous land enclosing a recess of substantial area, the land being shaped to fit closely against the uniform bearing surface and the recess being of very shallow depth relative to the land, means for applying a holding force to the slipper to hold the land against the bearing surface and a passage adapted to supply hydraulic liquid at pressure to the recess, there being a plurality of recesses within the continuous land isolated one from the other by extending the land inwardly to the passage at a plurality of positions, and each of the recesses including a groove adjacent to the continuous land.

References Cited

UNITED STATES PATENTS

| 3,120,816 | 2/1964 | Firth et al. | 103—162 |
| 3,180,276 | 4/1965 | Andrews et al. | 103—162 |
| 3,194,173 | 7/1965 | Thoma | 308—9 X |
| 3,200,760 | 8/1965 | Thoma et al. | 103—162 |

FOREIGN PATENTS

| 983,310 | 2/1965 | Great Britain. |

FREDERICK L. MATTESON, JR., *Primary Examiner.*

ROBERT A. DUA, *Assistant Examiner.*